United States Patent
Chen et al.

(10) Patent No.: US 12,529,213 B1
(45) Date of Patent: Jan. 20, 2026

(54) WATER FAUCET WITH WATER FLOW MONITORING

(71) Applicants: Jui-Chien Chen, Lugang Township, Changhua County (TW); Jui-Ching Chen, Lugang Township, Changhua County (TW)

(72) Inventors: Jui-Chien Chen, Lugang Township, Changhua County (TW); Jui-Ching Chen, Lugang Township, Changhua County (TW)

( * ) Notice: Subject to any disclaimer, the term of this patent is extended or adjusted under 35 U.S.C. 154(b) by 0 days.

(21) Appl. No.: 18/895,439

(22) Filed: Sep. 25, 2024

(51) Int. Cl.
E03C 1/04 (2006.01)
E03C 1/05 (2006.01)

(52) U.S. Cl.
CPC .............. *E03C 1/04* (2013.01); *E03C 1/057* (2013.01)

(58) Field of Classification Search
CPC .......... E03C 1/04; E03C 1/057; E03C 1/0401; E03C 2001/026
See application file for complete search history.

(56) References Cited

U.S. PATENT DOCUMENTS

| | | | | |
|---|---|---|---|---|
| 4,520,516 A * | 6/1985 | Parsons | ................... | E03C 1/057 367/96 |
| 4,756,030 A * | 7/1988 | Juliver | ................... | E03C 1/055 4/677 |
| 4,936,508 A * | 6/1990 | Ingalz | ................... | G01F 15/001 340/610 |
| 5,782,263 A * | 7/1998 | Isaacson, Jr | ............ | F16K 17/20 73/861.78 |
| 7,306,115 B2 * | 12/2007 | Beachy | ................... | G01F 1/103 222/14 |
| 7,326,334 B2 * | 2/2008 | Boyd | ..................... | B01D 35/04 210/419 |
| 9,657,464 B2 * | 5/2017 | Dunki-Jacobs | ..... | F16K 11/0743 |
| 9,695,579 B2 * | 7/2017 | Herbert | ................... | E03C 1/057 |
| 9,919,939 B2 * | 3/2018 | Rosko | ....................... | C02F 1/78 |
| 10,508,423 B2 * | 12/2019 | Herbert | ................... | F03B 13/00 |
| 10,675,573 B2 * | 6/2020 | Miller | ..................... | B01D 35/04 |
| 11,655,620 B2 * | 5/2023 | Zhang | ..................... | F16K 11/22 137/78.1 |

(Continued)

FOREIGN PATENT DOCUMENTS

CN 108826699 A * 11/2018 ........... F24H 9/2014
CN 208900800 U * 5/2019

(Continued)

*Primary Examiner* — David Colon-Morales (57) ABSTRACT

A water faucet with water flow monitoring, characterized by the following components: a faucet main body including a water outlet component, a water inlet, and a housing chamber; an outlet control valve provided on one side of the housing chamber; an internal water guide in the housing chamber, including a water outlet guiding channel and an inlet housing with a flow meter housing space, along with a circuit board mounting section aligned in height with the flow meter housing space; a flow meter in the housing space, comprising an outer casing and a rotatable impeller with magnetic elements; a detecting circuit board embedded in the circuit board mounting section, featuring a magnetic detecting component aligned with the magnetic elements of the flow meter; and a limiting connector assembled to the inlet housing to block and secure the flow meter.

10 Claims, 9 Drawing Sheets

(56) References Cited

U.S. PATENT DOCUMENTS

| | | | | |
|---|---|---|---|---|
| 11,761,184 | B2* | 9/2023 | Veros | G10L 15/22 |
| | | | | 4/623 |
| 11,802,397 | B2* | 10/2023 | Zhang | E03C 1/057 |
| 12,000,125 | B2* | 6/2024 | Yan | G01F 1/58 |
| 12,138,356 | B2* | 11/2024 | Smith | G01N 21/94 |
| 2009/0154524 | A1* | 6/2009 | Girelli | E03C 1/0404 |
| | | | | 4/597 |
| 2009/0188995 | A1* | 7/2009 | Onodera | E03C 1/057 |
| | | | | 239/383 |
| 2012/0318386 | A1* | 12/2012 | Guzman | E03C 1/057 |
| | | | | 137/560 |
| 2016/0326732 | A1* | 11/2016 | McCormick | G05D 7/0635 |

FOREIGN PATENT DOCUMENTS

| | | | | |
|---|---|---|---|---|
| DE | 19623729 A1 * | 12/1997 | | G01D 3/022 |
| ES | 2994015 A1 * | 1/2025 | | G01F 1/05 |
| WO | WO-2018222040 A1 * | 12/2018 | | G01F 1/075 |

* cited by examiner

WATER FAUCET WITH WATER FLOW MONITORING

FIELD OF INVENTION

The present invention relates to a water faucet, in particular disclosing an innovative structure of a water faucet with water flow monitoring.

BACKGROUND OF THE INVENTION

With the rapid advancement of technology, water faucets in recent years have increasingly incorporated some smart features, such as the ability to detect water flow and display it on an LCD panel. This added convenience helps remind users when the filter cartridge is due for replacement.

In conventional faucets, the flow detecting structure typically must be installed in the water flow path to accurately detect the flow rate. However, the flow detector also needs to be connected to a circuit board via a signal transmission line, which allows the circuit board to interpret the signal and convert it into display data.

As noted above, the main challenge facing the industry is to ensure sealing where the signal transmission line exits the flow path. However, due to the small diameter of the transmission line, it is particularly difficult to achieve a durable and effective seal. As a result, the flow detecting structures in conventional faucets have consistently struggled with water leakage, making this a significant technical issue that requires further improvement and innovation.

SUMMARY OF THE INVENTION

The main purpose of the present invention is to provide a water faucet with water flow monitoring. It seeks to address the technical challenge of developing a novel faucet structure that offers enhanced practicality and innovation.

In accordance with the foregoing purpose, the technical features of the present invention focus primarily on providing the faucet with water flow monitoring comprising: a faucet main body including a water outlet component, a water inlet, and a housing chamber positioned between the water outlet component and the water inlet; an outlet control valve provided on one side of the housing chamber to control the opening and closing of the water outlet and the flow condition of the water outlet component; an internal water guide accommodated within the housing chamber, including a water outlet guiding channel and an inlet housing, wherein a flow meter housing space is formed within the inlet housing, while a circuit board mounting section is located on a side outside of the internal water guide, and two pin-placing holes are further formed at the position below the circuit board mounting section on the internal water guide; a flow meter housed in the flow meter housing space, comprising an outer casing and a rotatable impeller, wherein the outer casing includes an inlet port and an outlet port each with a central axle hole, the rotatable impeller has axle posts at its upper and lower ends rotatably installed in the axle holes, and the rotatable impeller also includes one or more magnetic elements; a detecting circuit board embedded and positioned in the circuit board mounting section, including a magnetic detecting component positioned to face the magnetic element of the rotatable impeller in the flow meter and to be spaced apart therefrom accordingly; a limiting connector assembled to the inlet housing of the internal water guide to secure the flow meter and preventing it from falling out, with a narrowed insertion section formed at a position of the outside of the limiting connector; and a radial U-shaped pin having two spaced-apart insertion ends and a bridge segment connecting the two insertion ends, wherein the two insertion ends pass through the two pin-placing holes of the inlet housing and are inserted into the narrowed insertion section of the limiting connector, thereby securing and positioning the limiting connector; wherein the height of the circuit board mounting section is aligned with the height of the flow meter housing space, such that the height position of the magnetic detecting component on the detecting circuit board is aligned within the height range of the magnetic element.

The main effects and advantages of the present invention stem from the spaced, corresponding arrangement between the magnetic detecting component of the detecting circuit board and the flow meter. This magnetic detection allows them to communicate wirelessly, eliminating the need for wired connections. As a result, the flow meter can be completely enclosed within the water path, eliminating the problem of outgoing transmission lines as seen in conventional systems. This innovation simplifies the structure, facilitates easier assembly, and effectively addresses issues such as component water leakage and durability concerns, ensuring both practical improvement and enhanced industrial utility.

Another purpose of the present invention is to enhance practicality by reducing the coefficient of friction between the axle posts and the axle holes, preventing the generation of plastic dust and increasing the safety and hygiene of drinking water, which is achieved by an additional technical feature wherein ball bearings are interposed between each axle post at the upper and lower ends of the rotatable impeller of the flow meter and each corresponding axle hole in the outer casing.

DETAILED DESCRIPTION OF THE PREFERRED EMBODIMENTS

Reference is made to FIGS. 1 to 8, which show a preferred embodiment of the present invention of a water faucet with water flow monitoring. However, this embodiment is for illustrative purposes only and does not limit the present application to this structure.

Figure 5:
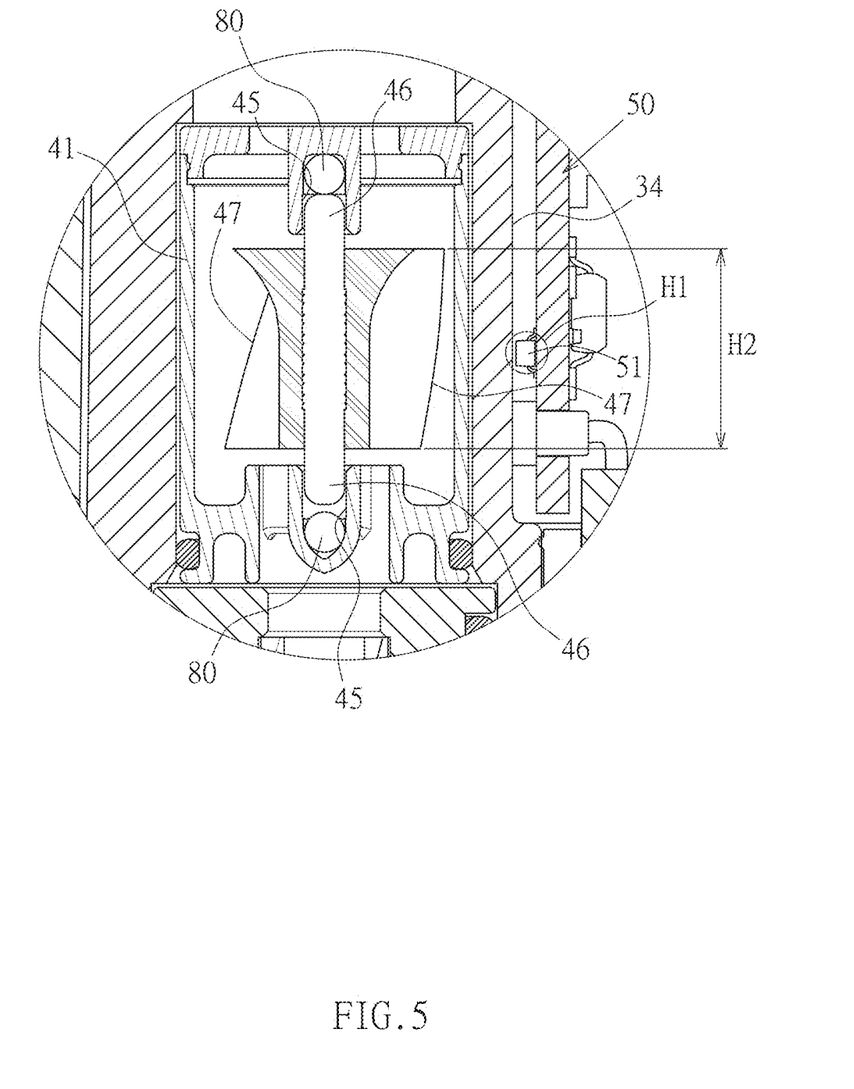
FIG. 5 is a partial enlarged view of FIG. 4.
Figure 6:
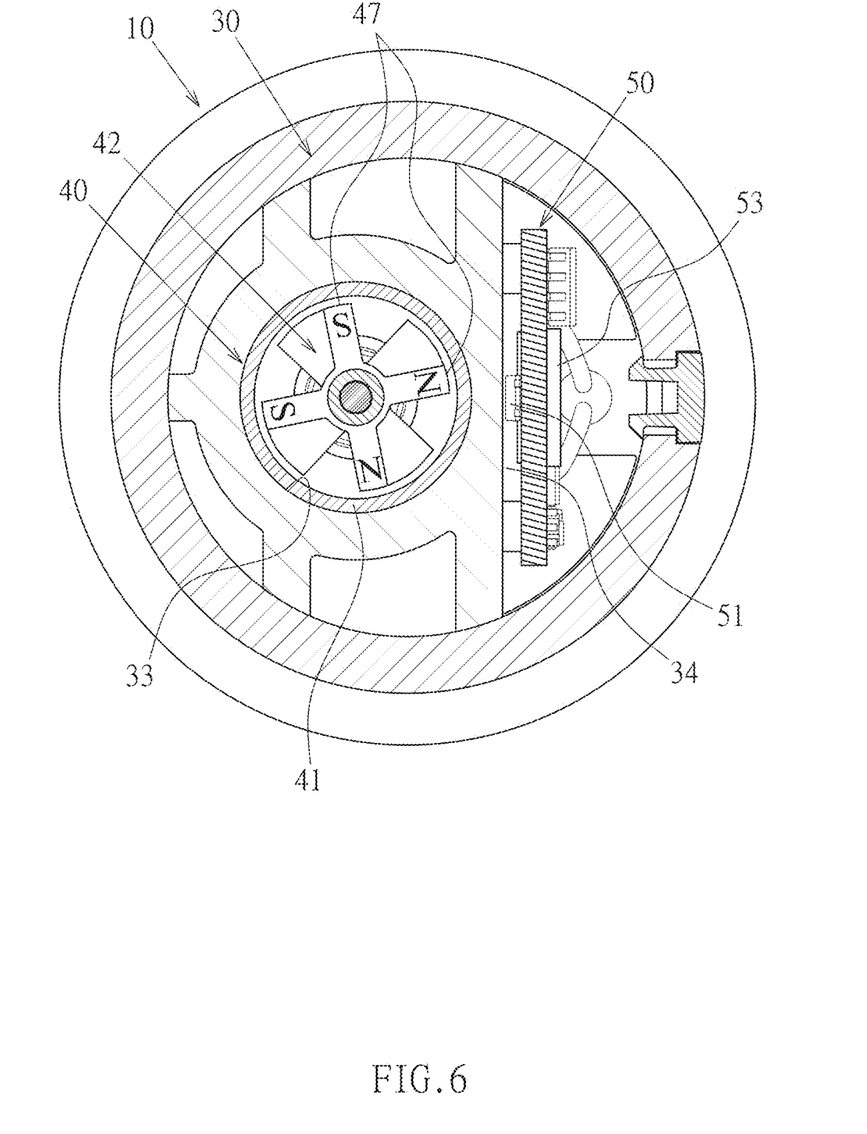
FIG. 6 is a line 6-6 sectional view of FIG. 4.

The water faucet with flow monitoring comprises the following components: A faucet main body 10 including a water outlet component 11 (such as a gooseneck faucet), a water inlet 12, and a housing chamber 13 positioned between the water outlet component 11 and the water inlet 12; an outlet control valve 20 provided on one side of the housing chamber 13 to control the opening and closing of the water outlet and the flow condition of the water outlet component 11; an internal water guide 30 accommodated within the housing chamber 13, including a water outlet guiding channel 31 and an inlet housing 32, wherein a flow meter housing space 33 is formed within the inlet housing 32, while a circuit board mounting section 34 is located on a side outside of the internal water guide 30, and two pin-placing holes 325 are further positioned below the circuit board mounting section 34 on the internal water guide 30; a flow meter 40 housed in the flow meter housing space 33 and composed of an outer casing 41 and a rotatable impeller 42, wherein the outer casing 41 includes an inlet port 43 and an outlet port 44, axle holes 45 are formed at the centers of both the inlet port 43 and the outlet port 44, and axle posts 46 are positioned at the upper and lower ends of the rotatable impeller 42 to allow it to rotate within the axle holes 45, while the rotatable impeller 42 also includes one or more magnetic elements 47; a detecting circuit board 50 embedded in the circuit board mounting section 34, the detecting circuit board 50 including a magnetic detecting component 51 positioned to face the magnetic element 47 of the rotatable impeller 42 in the flow meter 40 and to be spaced apart therefrom accordingly; a limiting connector 60 assembled to the inlet housing 32 of the internal water guide 30 to secure the flow meter 40 and preventing it from falling out, with a narrowed insertion section 61 formed at a position of the outside of the limiting connector 60; and a radial U-shaped pin 70 having two spaced-apart insertion ends 71 and a bridge segment 72 connecting the two insertion ends 71, wherein the two insertion ends 71 pass through the two pin-placing holes 325 of the inlet housing 32 and are inserted into the narrowed insertion section 61 of the limiting connector 60, thereby securing and positioning the limiting connector 60. The height of the circuit board mounting section 34 is aligned with the height of the flow meter housing space 33. As shown in FIG. 5, the height position H1 of the magnetic detecting component 51 on the detecting circuit board 50 must be aligned within the height range H2 of the magnetic element 47 on the rotatable impeller 42 to achieve optimum magnetic detection performance.

Figure 3:
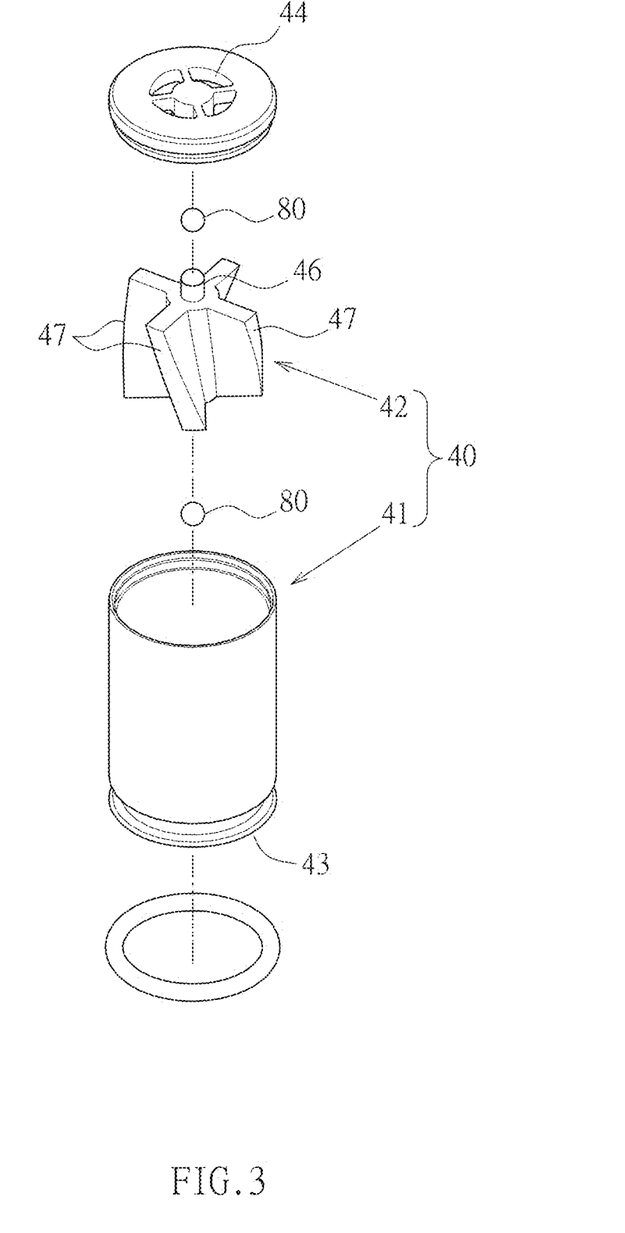
FIG. 3 is an exploded perspective view of the flow meter of the preferred embodiment of the present invention.

As shown in FIG. 3, in this embodiment, ball bearings 80 are interposed between each axle post 46 at the upper and lower ends of the rotatable impeller 42 of the flow meter 40 and each axle hole 45 of the outer casing 41 to reduce the friction coefficient between each axle post 46 and each axle hole 45. Since the axle post 46 is usually made of metal material and the axle hole 45 is usually made of plastic material, if the axle post 46 and the axle hole 45 were to directly contact and frictionally rub, plastic dust may be generated over a long period of time, which may cause water pollution issues and affect the safety and hygiene of drinking water. Therefore, by installing the ball bearings 80 in this embodiment, the above problem can be effectively solved.

In addition, the end of each axle post 46 is formed in an arched conical shape to reduce the coefficient of friction between each axle post 46 and each ball bearing 80.

Figure 4:
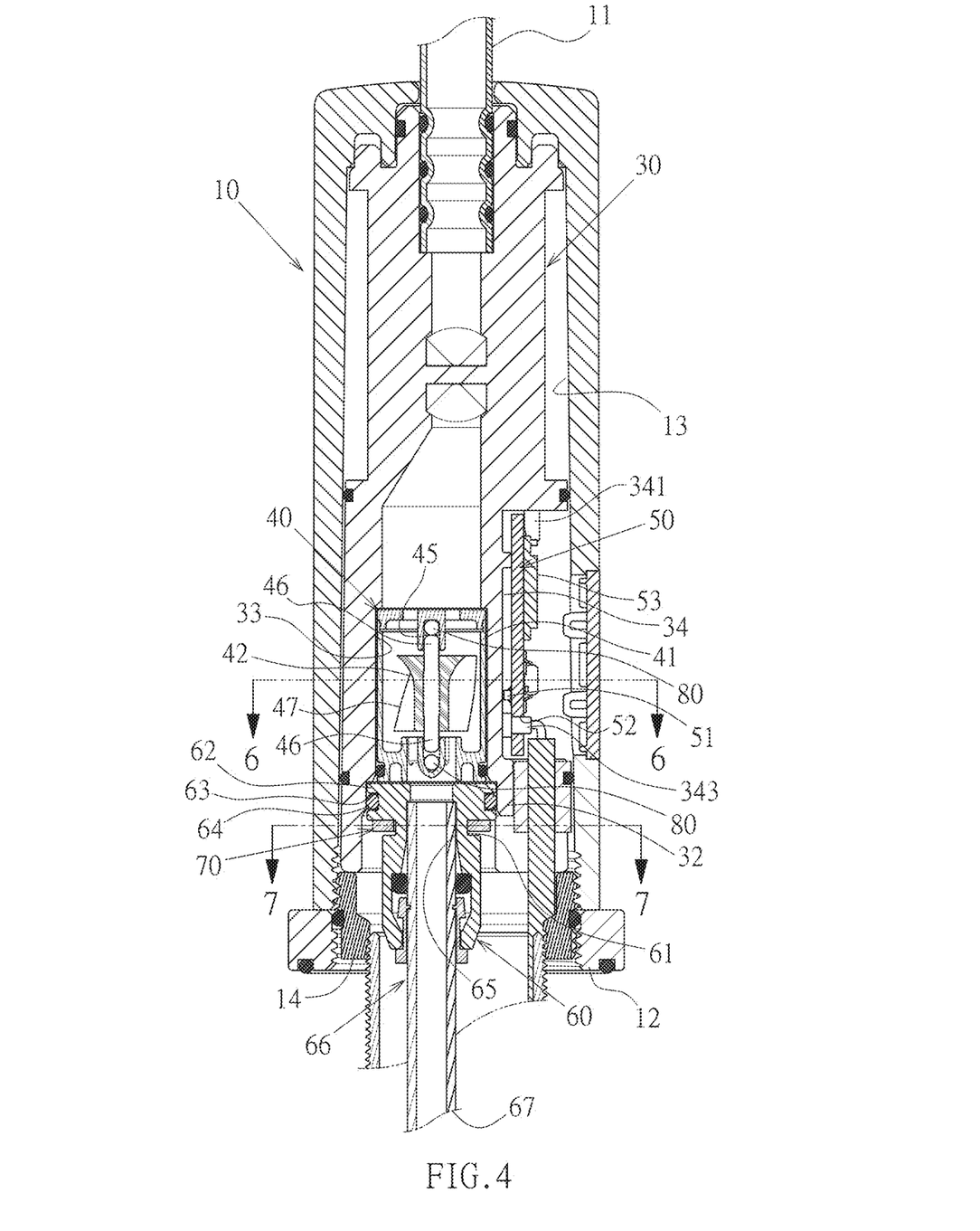
FIG. 4 is an assembled sectional view of the preferred embodiment of the present invention.

As shown in FIG. 4, in this embodiment, the limiting connector 60 further includes a pressure washer 62 having a concave annular groove 63 formed on its outer periphery for receiving an elastic ring 64 used to press against the inner wall of the inlet housing 32.

As shown in FIG. 4, in this embodiment, the limiting connector 60 further includes an inlet pipe socket 65 for inserting a water inlet pipe 66 having a protruding end 67 that protrudes downwardly from the water inlet 12 of the faucet main body 10.

Figure 8:
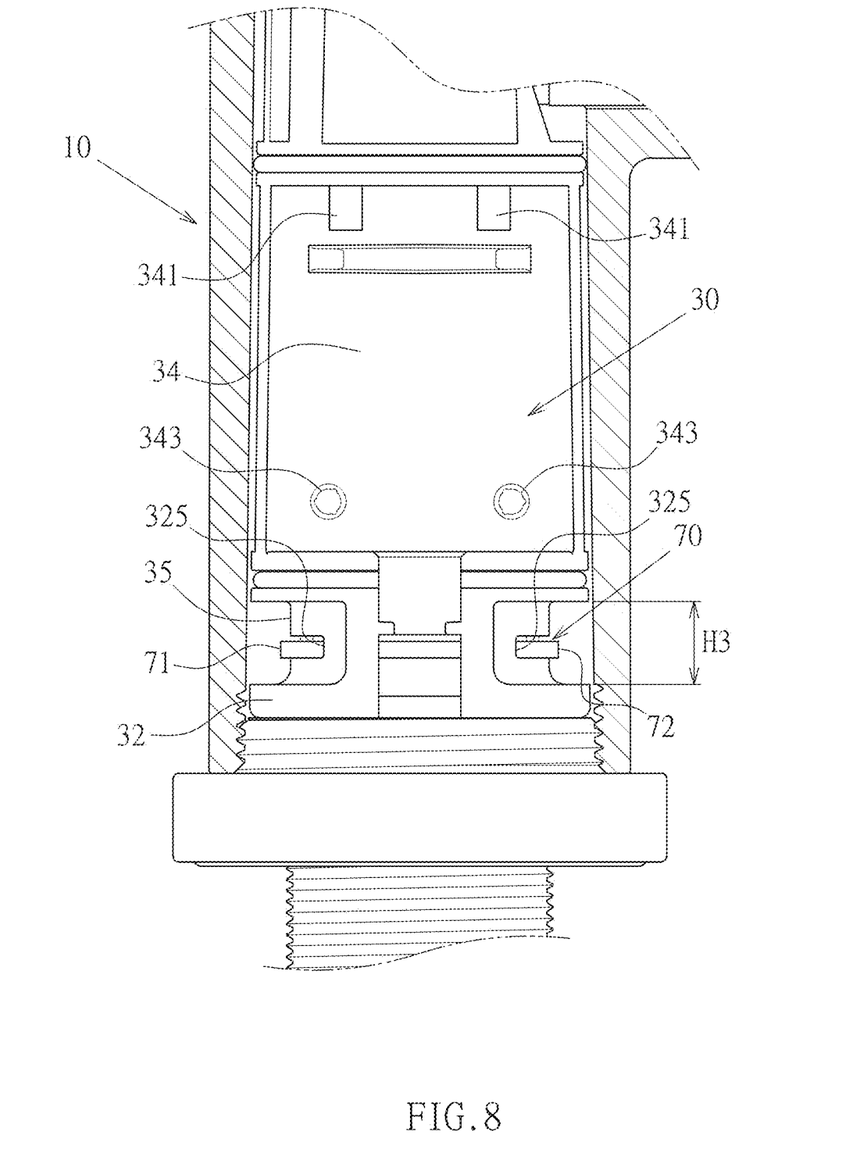
FIG. 8 is a partial side view of the internal water guide of the preferred embodiment of the present invention (Note: The main body of the faucet is shown in sectional view)

As shown in FIG. 8, in this embodiment, where the pin-placing holes 325 are located on the inlet housing 32 of the internal water guide 30, a tapered neck 35 is further formed, and a working height H3 of the tapered neck 35 is between 0.5 cm and 1.5 cm. In this embodiment, the working height of the tapered neck 35 is mainly designed to allow human fingers to reach in, facilitating the assembly and disassembly of the radial U-shaped pin 70. On the other hand, the tapered neck 35 also provides a space for accommodating the insertion ends 71 and the bridge segment 72 of the radial U-shaped pin 70 inwardly, thereby reducing the outer diameter and volume of the internal water guide 30 and relatively reducing the volume of the faucet main body 10.

As shown in FIG. 4, in this embodiment, a fixing ring component 14 is further screwed onto the inner wall of the water inlet 12 of the faucet main body 10, serving to block and secure the internal water guide 30.

Figure 1:
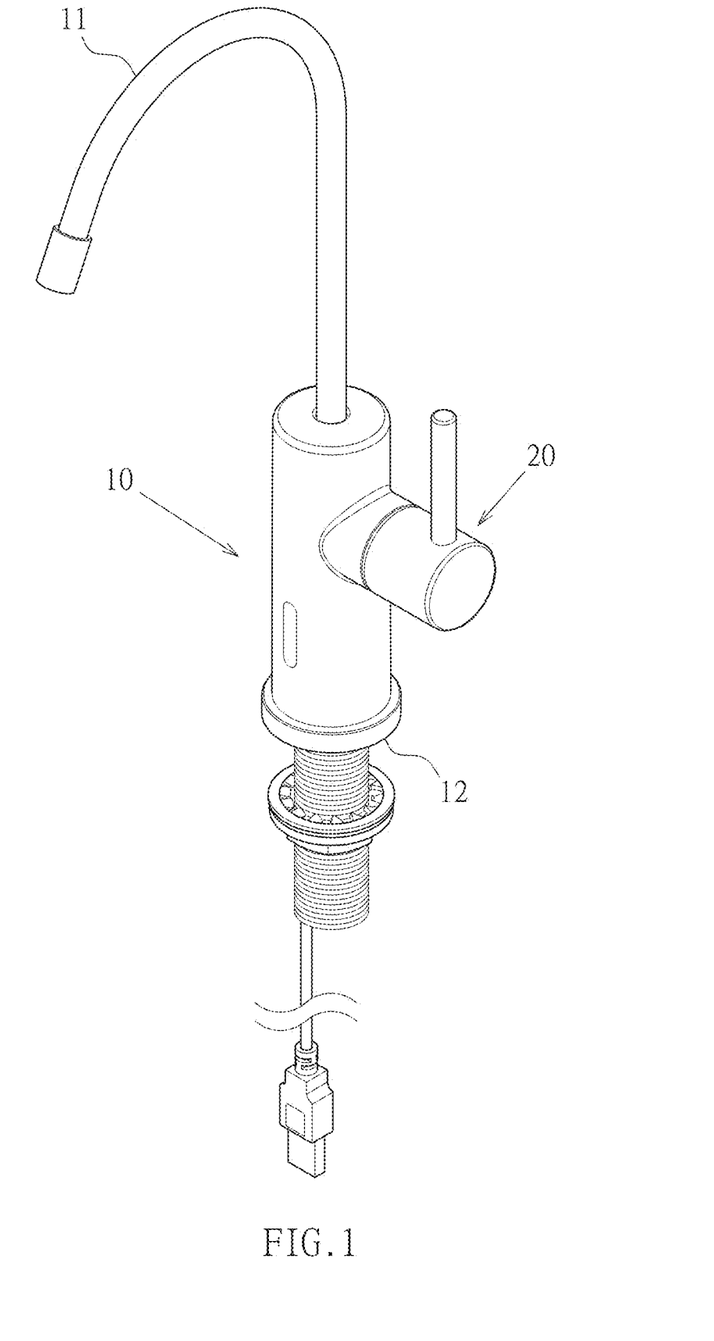
FIG. 1 is an assembled perspective view of a preferred embodiment of the present invention.
Figure 2:
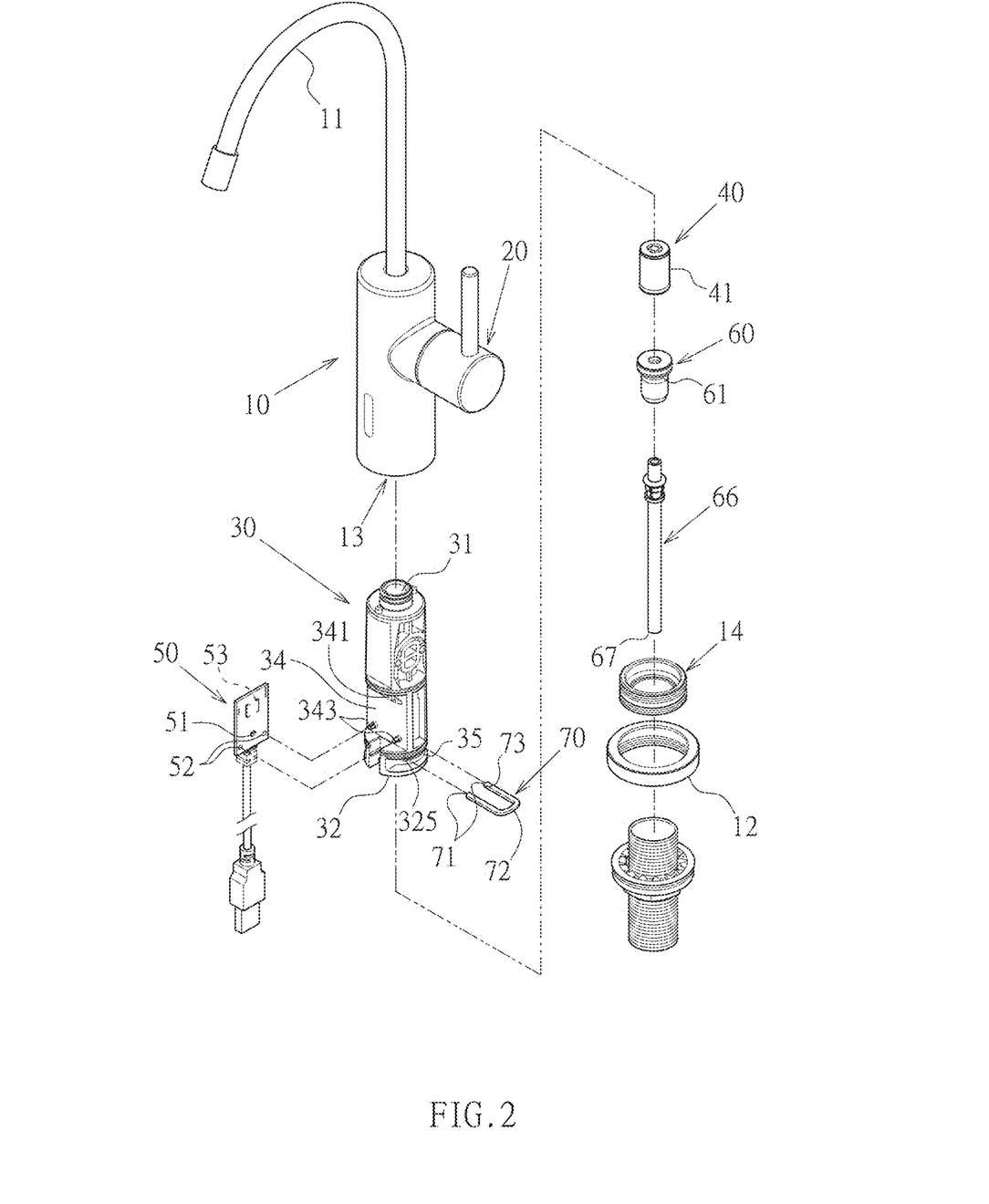
FIG. 2 is an exploded perspective view of partial components of the preferred embodiment of the present invention.

As shown in FIG. 2, in this embodiment, the circuit board mounting section 34 includes embedding edges 341 and positioning posts 343 (in this embodiment, a two-post configuration) arranged in an up and down spaced layout to align with positioning holes 52 on the detecting circuit board 50. To position the detecting circuit board 50, the upper edge is first inserted into the embedding edges 341, and then the positioning holes 52 are fitted onto the positioning posts 343, thereby securing the detecting circuit board 50. This design allows for quick and tool-free assembly and positioning of the detecting circuit board 50, making the process more convenient.

As shown in FIG. 5, in this embodiment, the rotatable impeller 42 of the flow meter 40 includes four magnetic elements 47, each magnetic element 47 being spaced at an angle of 90°, and the magnetic pole distribution order of the four magnetic elements 47 is N, N, S, S. The continuous distribution pattern of the same polarity of the magnetic elements 47 disclosed in this embodiment has the main advantage that when the rotatable impeller 42 rotates at a higher speed, it can effectively reduce the error rate in detection.

Figure 7:
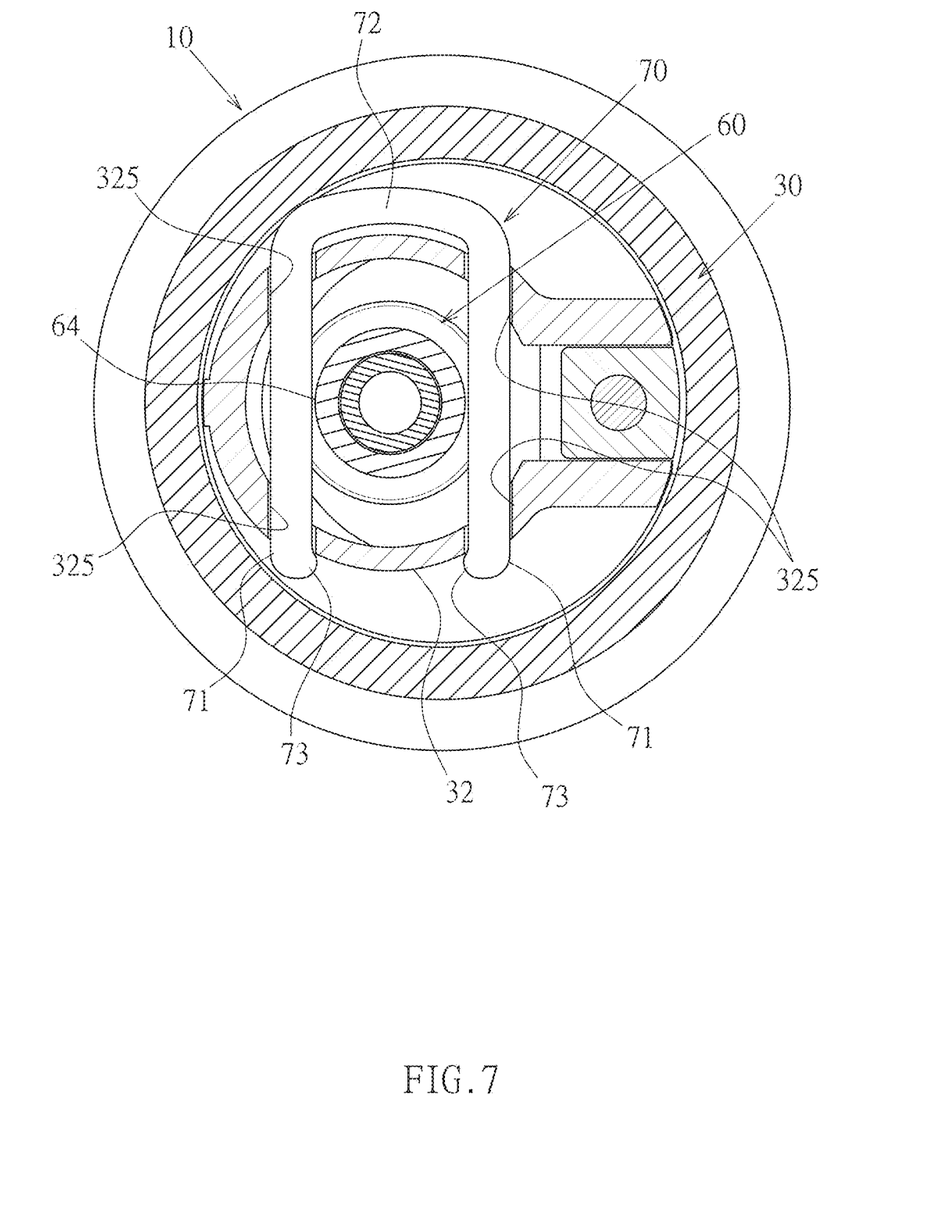
FIG. 7 is a line 7-7 sectional view of FIG. 4.

As shown in FIG. 7, in this embodiment, each insertion end 71 of the radial U-shaped pin 70 further forms a locking flange 73 that is used to engage the pin-placing hole 325 of the inlet housing 32, thereby further enhancing the stability of the embedded state of the radial U-shaped pin 70.

Figure 9:
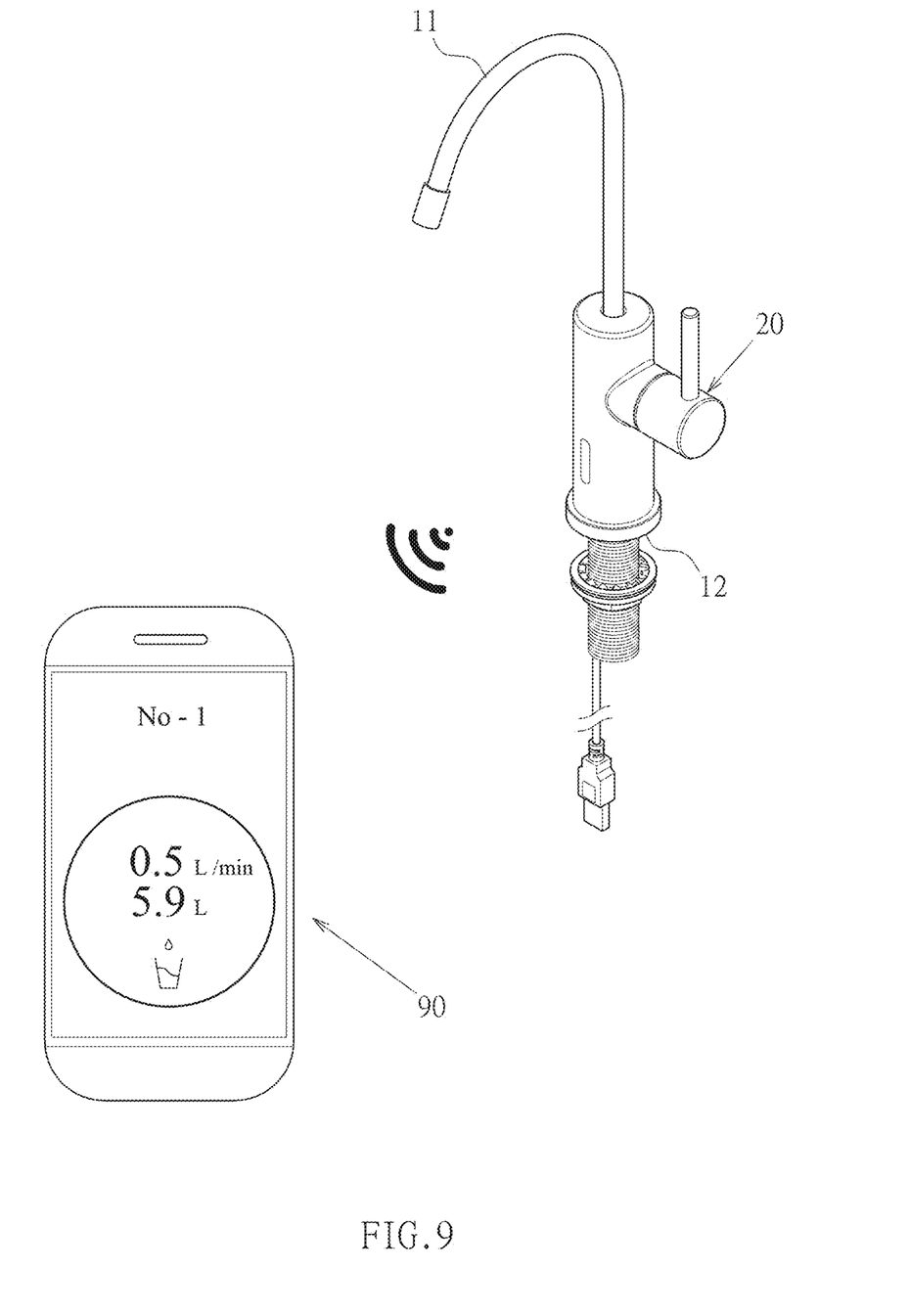
FIG. 9 is a wireless transmission embodiment of the present invention.

As shown in FIGS. 2 and 4, in this embodiment, the detecting circuit board 50 further includes a wireless transmission module 53. In a specific application of this embodiment, as shown in FIG. 9, the wireless transmission module 53 can connect to the user's mobile device 90 through a wireless transmission means (such as Bluetooth), thereby monitoring through the mobile device 90 to synchronously display the detecting data of the faucet's flow meter 40 on the screen of the mobile device 90 in real time to facilitate the user's flow monitoring and accurately perform a filter cartridge replacement. The "0.5 L/min" displayed on the mobile device 90 in FIG. 9 is a flow rate value, while "5.9 L" is the cumulative flow value. Assuming that the preset water purification value of the filter is 5000 liters (L), when the cumulative flow value reaches this preset value, it would be the appropriate time to replace the filter cartridge. The "No—1" displayed on the mobile device 90 in FIG. 9 corresponds to the number of the faucet with water flow monitoring shown on the right side of the drawing. As can be imagined, users can use the technology of this embodiment to monitor the flow of multiple groups of water faucets with water flow monitoring of the same structure, thereby achieving the purpose of intelligent management.

Due to the structural composition and technical features described above, the water faucet with water flow monitoring disclosed in the present invention is actually used as shown in FIG. 4. Since the magnetic detecting component 51 of the detecting circuit board 50 and the flow meter 40 are configured in a spaced yet corresponding relationship, allowing magnetic detection without the need for wired connections. This enables the flow meter 40 to be completely enclosed within the water path space, while the detecting circuit board 50 is assembled completely outside of the water path, eliminating the need for transmission lines as seen in conventional systems, resulting in a simplified structure and more convenient assembly, while effectively addressing issues such as water leakage and durability concerns. Furthermore, the narrowed insertion section 61 formed on the limiting connector 60, together with the use of the two insertion ends 71 of the radial U-shaped pin 70 which pass through the pin-placing holes 325 of the inlet housing 32 and into the narrowed insertion section 61, securely position the limiting connector 60, and the two insertion ends 71 cleverly avoid the water flow path while ensuring stable pin positioning, thereby enabling the flow meter 40 to be quickly and easily assembled and positioned.

What is claimed is:

1. A water faucet with water flow monitoring, comprising:
a faucet main body including a water outlet component, a water inlet, and a housing chamber positioned between the water outlet component and the water inlet;
an outlet control valve provided on one side of the housing chamber to control the opening and closing of the water outlet and the flow condition of the water outlet component;
an internal water guide accommodated within the housing chamber, including a water outlet guiding channel and an inlet housing, wherein a flow meter housing space is formed within the inlet housing, while a circuit board mounting section is located on a side outside of the internal water guide, and two pin-placing holes are further formed at the position below the circuit board mounting section on the internal water guide;
a flow meter housed in the flow meter housing space, comprising an outer casing and a rotatable impeller, wherein the outer casing includes an inlet port and an outlet port each with a central axle hole, the rotatable impeller has axle posts at its upper and lower ends rotatably installed in the axle holes, and the rotatable impeller also includes one or more magnetic elements;
a detecting circuit board embedded and positioned in the circuit board mounting section, including a magnetic detecting component positioned to face the magnetic element of the rotatable impeller in the flow meter and to be spaced apart therefrom accordingly;
a limiting connector assembled to the inlet housing of the internal water guide to secure the flow meter and preventing it from falling out, with a narrowed insertion section formed at a position of the outside of the limiting connector; and
a radial U-shaped pin having two spaced-apart insertion ends and a bridge segment connecting the two insertion ends, wherein the two insertion ends pass through the two pin-placing holes of the inlet housing and are inserted into the narrowed insertion section of the limiting connector, thereby securing and positioning the limiting connector; wherein a height of the circuit board mounting section is aligned with a height of the flow meter housing space, such that the height position of the magnetic detecting component on the detecting circuit board is aligned within a height range of the magnetic element.

2. The water faucet with water flow monitoring according to claim 1, wherein ball bearings are interposed between each axle post at the upper and lower ends of the rotatable impeller of the flow meter and each axle hole of the outer casing to reduce the friction coefficient between each axle post and each axle hole.

3. The water faucet with water flow monitoring according to claim 2, wherein the end of each axle post is formed in an arched conical shape to reduce the coefficient of friction between each axle post and each ball bearing.

4. The water faucet with water flow monitoring according to claim 1, wherein the limiting connector includes a pressure washer having a concave annular groove formed on its outer periphery for receiving an elastic ring, which is used to press against the inner wall of the inlet housing.

5. The water faucet with water flow monitoring according to claim 1, wherein the limiting connector further includes an inlet pipe socket for inserting a water inlet pipe having a protruding end that protrudes downwardly from the water inlet of the faucet main body.

6. The water faucet with water flow monitoring according to claim 1, wherein a tapered neck is further formed where the pin-placing holes are located on the inlet housing of the internal water guide, and a working height of the tapered neck is between 0.5 cm and 1.5 cm.

7. The water faucet with water flow monitoring according to claim 1, wherein a fixing ring component is further screwed onto the inner wall of the water inlet of the faucet main body, serving to block and secure the internal water guide.

8. The water faucet with water flow monitoring according to claim 1, wherein the circuit board mounting section includes embedding edges and positioning posts arranged in an up and down spaced layout to align with positioning holes on the detecting circuit board; whereby when positioning the detecting circuit board, the upper edge is first inserted into the embedding edges and then the positioning holes are fitted onto the positioning posts, thereby securing the detecting circuit board.

9. The water faucet with water flow monitoring according to claim 1, wherein the rotatable impeller of the flow meter includes four magnetic elements, each magnetic element being spaced at an angle of 90°, and the magnetic pole distribution order of the four magnetic elements is N, N, S, S.

10. The water faucet with water flow monitoring according to claim 1, wherein each insertion end of the radial U-shaped pin further forms a locking flange that is used to engage the pin-placing hole of the inlet housing.

\* \* \* \* \*